Jan. 22, 1924.
G. H. TRIPP
1,481,572
BUMPER FOR AUTOMOBILES
Filed Aug. 20, 1923
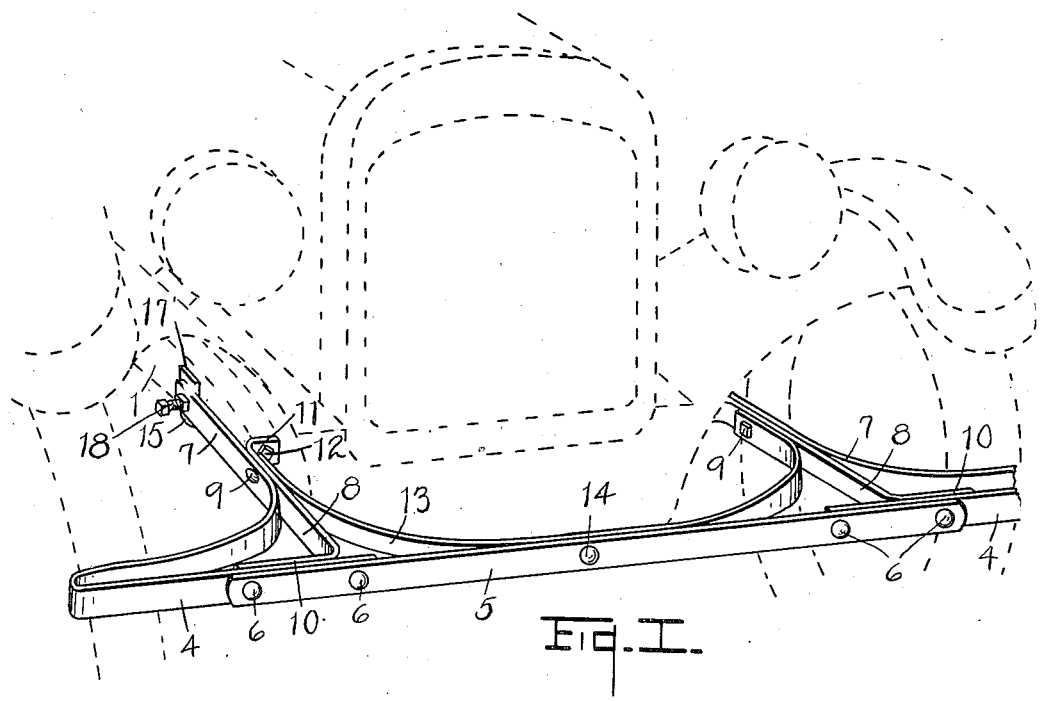
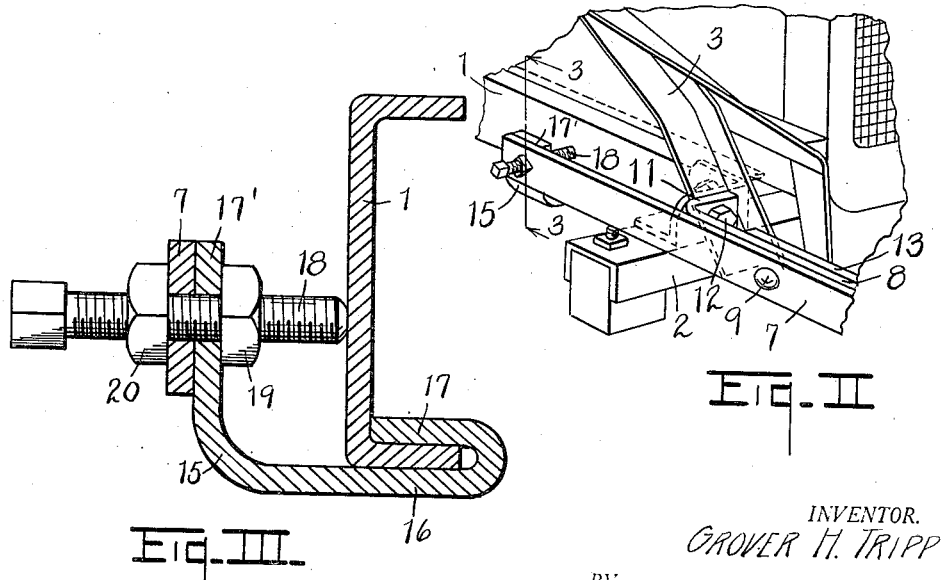
INVENTOR.
GROVER H. TRIPP
BY
Chappell Earl
ATTORNEYS Patented Jan. 22, 1924.

1,481,572

UNITED STATES PATENT OFFICE.

GROVER H. TRIPP, OF ALLEGAN, MICHIGAN.

BUMPER FOR AUTOMOBILES.

Application filed August 20, 1923. Serial No. 658,294.

*To all whom it may concern:*

Be it known that I, GROVER H. TRIPP, a citizen of the United States, residing at the city and county of Allegan, State of Michigan, have invented certain new and useful Improvements in Bumpers for Automobiles, of which the following is a specification.

This invention relates to improvements in bumpers for automobiles.

The main object of this invention is to provide an improved bumper which may be made of comparatively light material and is, at the same time, very strong and capable of withstanding severe impacts.

A further object is to provide an improved attaching means which enables the ready attachment without necessity for structural modification in the vehicle.

Objects pertaining to details and economies of my improvements will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a front perspective view of my improved bumper applied to a motor vehicle, the vehicle being partially indicated by dotted lines.

Fig. II is a fragmentary perspective view showing details of the attaching means, parts of a Chevrolet automobile being illustrated.

Fig. III is a detail vertical section on a line corresponding to line 3—3 of Fig. II looking in the direction of the arrows.

In the drawing similar reference numerals indicate similar parts in all of the views.

Referring to the drawing, 1 represents the longitudinal sill or side member of a motor vehicle frame, 2 a cross member thereof and 3 a frame member disposed transversely of the cross and longitudinal members. The longitudinal member is of channel cross section disposed facing inwardly as is common practice in automobile frame construction. These frame parts are shown mainly in conventional form and for the purpose of showing the operative relation of my improved bumper and attaching means thereto.

My improved bumper comprises a pair of looped end members 4 and a central impact member 5 formed of bar steel, the ends of the impact member being lapped upon the forward arms of the end members and secured thereto by bolts or rivets 6. The rear arms of the end members 4 are extended into supporting arms 7. Brace members 8 are provided for these supporting arms, these brace members being arranged on the inside of the supporting arms and secured thereto by the bolts 9, the forward ends of the brace members being turned laterally providing arms 10 which lap the rear sides of the front arms of the end members 4 and are secured thereto by the bolts 6. The rear ends of the brace members 8 are turned laterally providing frame attaching members 11 adapted to lap upon a portion of the frame, as the frame member 3, and secured thereto by the bolts 12.

The auxiliary bowed bumper member 13 is arranged between the brace members 8, its arms being lapped upon the inner side thereof and secured thereto by the bolts 9 which are disposed close to the attaching members 11. This auxiliary bumper member is secured centrally to the impact member 5 by means of the bolt 14.

With this arrangement of parts I provide a bumper which is capable of withstanding severe impacts and at the same time it may be made of comparatively light material. Further, it is so braced and supported that vibration both vertically and laterally is very slight when attached to the vehicle.

The rear ends of the arms 7 are secured to the longitudinal frame members 1 by means of L-shaped brackets 15 disposed with their horizontal arms 16 below the frame member, these arms being provided with hooks 17 engaging the lower legs of the frame members as shown in Fig III. The vertical arms 17' are disposed at the side of the frame member, the bolts 18 being arranged through the arms and provided with nuts 19 so that the bolts may be engaged with the side of the frame members and the bracket clamped firmly to the frame member. The bolt is arranged through the supporting arm 7 and provided with a second nut 20 which clamps the arm thereto.

With this arrangement I provide an attachment which may be made without structural changes in the vehicle frame, the bolt 12 being normally present, it only being necessary to remove the same and insert through the attaching member 11. The attaching bracket 15 is secured to the frame so that it does not sag or twist thereon.

I have illustrated and described my improvements as applied to a Chevrolet automobile. Slight modification might be required in adapting to other makes of automobiles but I have not illustrated these modifications as I believe that the structure illustrated will enable those skilled in the art to which my invention relates to embody or adapt the same as may be desired.

Having thus described my invention what I claim as new and desire to secure by Letters Patent is:

1. The combination with the frame of an automobile comprising a channel shaped longitudinal member disposed with the channel facing inwardly, of a bumper provided with a rearwardly projecting supporting arm, an L-shaped attaching bracket having a hook on its horizontal arm engaged with the bottom leg of the frame member and its vertical arm disposed at the side of the frame member, and a bolt disposed through the vertical arm of said bracket engaging the side of the said frame member, said bolt being provided with a nut engaging the inside of the bracket whereby the bracket is clamped to the frame member, said bolt being disposed through said bumper supporting arm and provided with a clamping nut engaging the outer side of said arm whereby said supporting arm is clamped upon the side of the bracket.

2. The combination with the frame of an automobile comprising a channel shaped longitudinal member disposed with the channel facing inwardly, of a bumper provided with a rearwardly projecting supporting arm, an L-shaped attaching bracket having a hook on its horizontal arm engaged with the bottom leg of the frame member and its vertical arm disposed at the side of the frame member, and a threaded clamping member disposed through said bracket engaging the side of the said frame member, said bumper arm being secured to the vertical arm of said bracket.

3. The combination with a frame member of an automobile, of a bumper provided with a supporting arm, an attaching bracket having a hook engaged within said frame member, an arm disposed at the side thereof, and a bolt disposed through the bracket arm engaging the side of the said frame member, said bolt being provided with a nut on the inside of the bracket whereby the bracket is clamped to the frame member, said bolt being disposed through said bumper supporting arm and provided with a clamping nut therefor.

4. The combination with the frame of an automobile comprising a channel shaped longitudinal member disposed with the channel facing inwardly, of a bumper, a supporting arm provided with a lateral thrust member engaging and secured to said frame, an L-shaped attaching bracket having a hook on its horizontal arm engaged with the bottom leg of the frame member and its vertical arm disposed at the side of the frame member, and a threaded clamping member disposed through said bracket engaging the side of the said frame member, said bumper arm being secured to the vertical arm of said bracket.

5. The combination with a frame member of an automobile, of a bumper, a supporting arm therefor provided with a lateral thrust member engaging and secured to said frame, an attaching bracket having a hook engaged within said frame member, an arm disposed at the side thereof, and a bolt disposed through the bracket arm engaging the side of the said frame member, said bolt being provided with a nut on the inside of the bracket whereby the bracket is clamped to the frame member, said bolt being disposed through said bumper supporting arm and provided with a clamping nut therefor.

6. A bumper comprising a pair of looped end members and a central impact member secured to the forward arms of said end members, the rear arms of said end members being extended into supporting arms, brace members disposed upon and secured to the inner side of said supporting arms, the front ends of said brace members being laterally turned and secured to the front arms of said end members, the rear ends of said brace members being turned inwardly providing frame attaching members, and a bowed auxiliary member disposed with its arms lapping said brace members and secured thereto adjacent the frame engaging parts thereof, said auxiliary member being centrally secured to said impact member.

7. A bumper comprising a pair of looped end members and a central impact member secured to the forward arms of said end members, the rear arms of said end members being extended into supporting arms, and brace members disposed upon and secured to the inner side of said supporting arms, the front ends of said brace members being laterally turned and secured to the front arms of said end members, the rear ends of said brace members being turned inwardly providing frame attaching members.

In witness whereof, I have hereunto set my hand.

GROVER H. TRIPP. [L. S.]